June 16, 1925.                                                  1,542,571
P. MUELLER ET AL
MIXING VALVE
Filed Nov. 1, 1924                        2 Sheets-Sheet 1
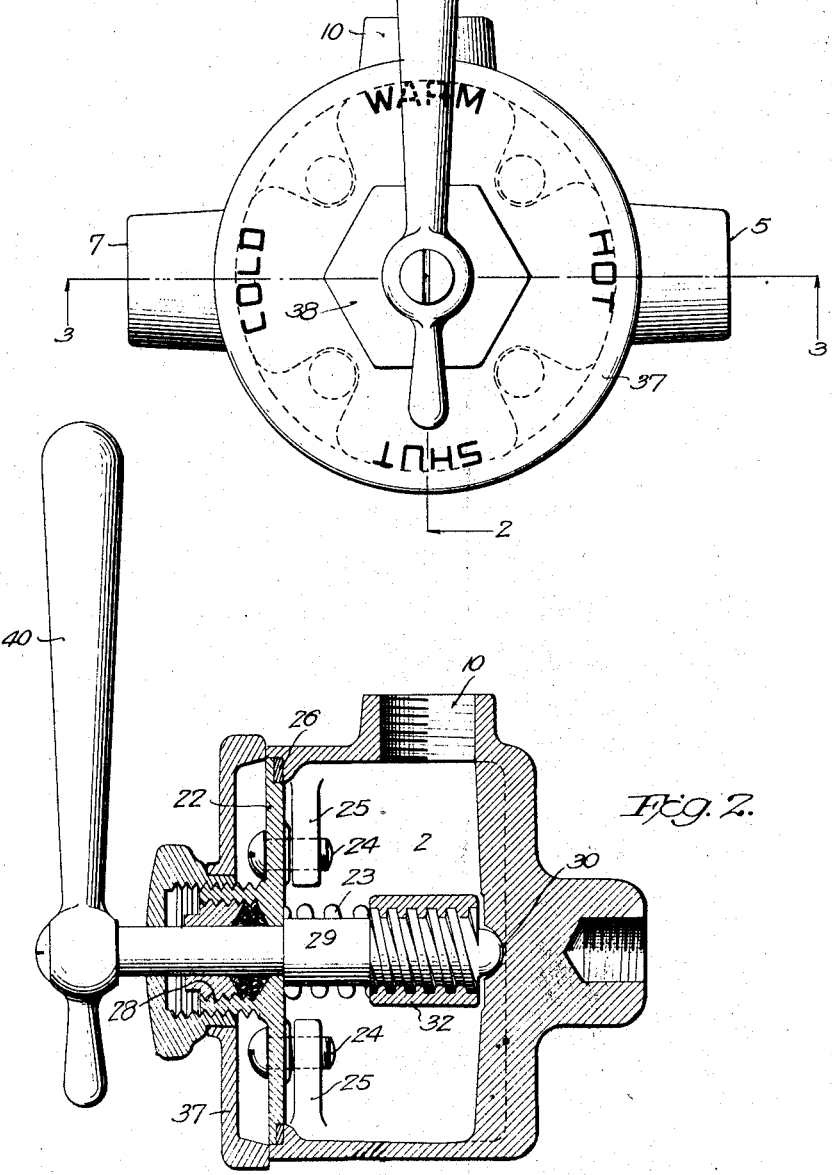
Inventor
Philip Mueller
Anton C. Schuermann.

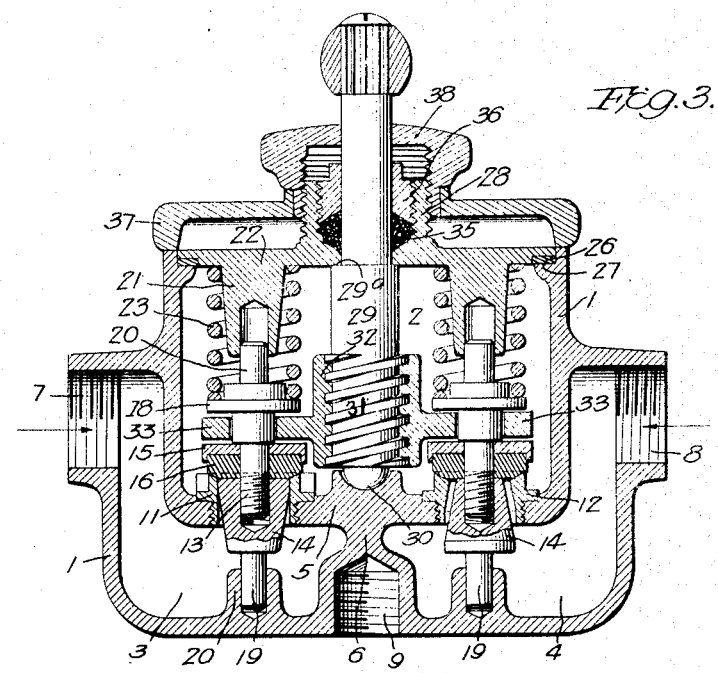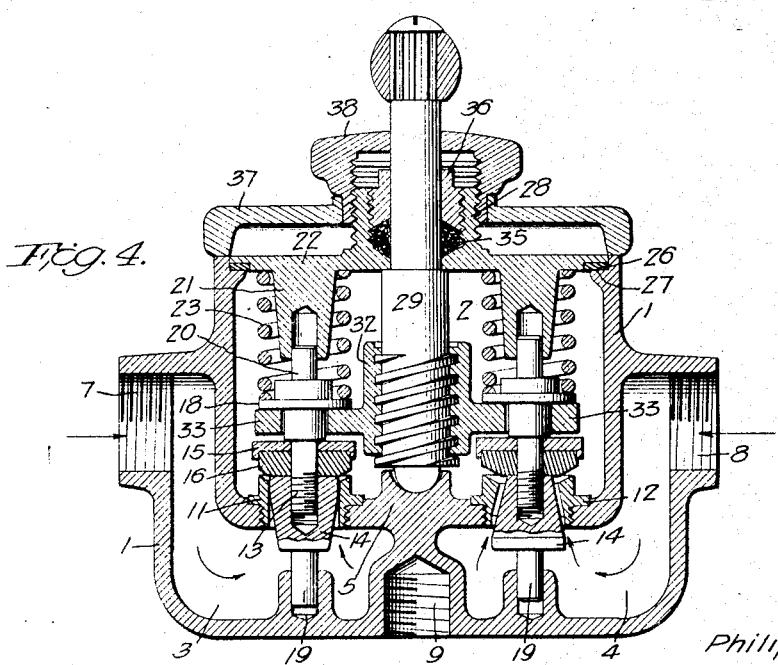

Patented June 16, 1925.

1,542,571

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

MIXING VALVE.

Application filed November 1, 1924. Serial No. 747,334.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Mixing Valves, of which the following is a specification.

The present invention relates to an improvement in mixing valves, being particularly adapted for valves controlling the flow of hot and cold water to a shower head or other plumbing fixture.

While some of the features of the invention hereinafter described are applicable to valves for mixing other fluid than hot or cold water, the improvements are particularly adapted for this purpose and such an embodiment of the invention will be described.

Among the objects of the invention may be mentioned the provision of a construction in which the movement of the valves in closing is in the opposite direction to the flow of liquid so as to avoid the possibility of "water hammer."

Another object is to provide a valve construction in which the valve heads are independently mounted and each is impelled toward its seat by a suitable spring, a common lifting device being provided for moving the valves from their seats in opposition to the spring pressure. This permits of the valves being properly seated even after a considerable period of use when the seat washer of the hot water valve may have become somewhat more worn than that of the cold water valve, as is frequently the case.

With the foregoing and other objects in view the invention resides in the construction and arrangement of parts that will be hereinafter described and particularly pointed out in the appended claims.

In the drawing:

Figure 1 is a face view or elevation of an embodiment of the invention;

Figure 2 is a vertical section substantially on the line 2—2 of Figure 1;

Figure 3 is a horizontal section substantially on the line 3—3 of Figure 1, showing both the hot and cold water valves in closed position;

Figure 4 is a section similar to Figure 3, showing the parts in a different relation, the cold water valve being moved slightly from its seat.

Referring to the drawings, in the several figures of which like reference characters designate corresponding parts, 1 designates the main body or casing of the valve which, as shown comprises a main mixing chamber 2 open at one end and suitable supply chambers 3, 4, separated from the chamber 2 by a wall 5 and from each other by a transverse partition 6. The chamber 3 is provided with an interiorly threaded inlet 7, adapted to receive a suitable hot water supply pipe and the chamber 4 is provided with a similar inlet 8 to receive a cold water supply pipe.

An internally threaded socket 9 is provided in the closed end of the casing to receive a suitable stud by which the entire device may be supported from a suitable upright.

The mixing chamber 2 is provided with an internally threaded outlet 10 adapted to be connected with a shower head or other plumbing fixture and said chamber communicates with the hot and cold water supply chambers 3, 4, through suitable ports in which are secured valve seats 11, 12.

Flow of water from either chamber 3, 4, to the mixing chamber 2 is controlled by a valve co-operating with the aforesaid valve seats. Each valve comprises a stem which at one end has a threaded section 13, onto which is screwed a valve body 14. Surrounding the stem and partially enclosed by a metal head 15 is an elastic washer 16, the exposed face of which is shaped to conform to the operative face or surface of the valve seat. The head 15 bears against the shoulder formed on the valve stem and said stem is provided, at a suitable distance from the valve head, with a flange 18.

The valve body 14 terminates in a reduced pin 19 which extends into, and is guided by, a socket formed in a boss 20 extending into the casing from the closed end thereof. The free end of the valve stem is reduced somewhat in diameter as at 20 and extends into a tubular boss 21, extending into the mixing chamber 2 from a cover plate or detachable closure 22. A coiled spring 23 surrounds the boss 21 and bears against the flange 18 on a valve stem and the inner surface of the cover plate 22, said spring acting to hold the valve in closed position with the flexible washer 16 bearing against the face of the valve seat.

The closure plate 22 is held in fixed position by screws 24 extending into lugs 25 that project into the mixing chamber 2, about the open end thereof. Preferably a packing ring 26 is fitted in a groove formed in the inner face of the cover or closure plate 22, and bears against an inwardly extending flange 27, extending about the open end of the casing 1.

The closure or cover plate 22 is provided with a tubular, outwardly extending boss which is threaded both interiorly and exteriorly and through such boss extends a rotatable stem 29, the inner end of which is seated, as at 30, in a bearing formed in the interior partition wall of the casing 1, separating the mixing chamber 2 from the supply chambers 3, 4. The stem 29 is provided with a threaded section 31 with which is engaged the body 32 of a valve lifting yoke the arms 33 of which are provided with suitable apertures through which the valve stems extend. As shown the passages in the arms 33 of the lifting yoke are of slightly greater diameter than the enclosed portions of the valve stems, so that the latter may move freely with relation to the yoke. The yoke arms are positioned between the flange 18 on the valve stem, and the valve head piece 15, so that as said yoke is moved outward a corresponding movement will be imparted to the valves when the arms 33 contact with the flanges 18.

The parts are preferably so proportioned that the arm 33 controlling outward movement of the cold water valve will contact with the flange 18 of the stem of that valve, slightly before the other arm 33 engages the corresponding flange 18 on the stem of the hot water valve. This insures that when the stem 29 is rotated to move the yoke and open the valves the cold water valve will be first actuated and cold water admitted to the mixing chamber and outlet 10 before any hot water is admitted to said chamber. Therefore, there can be no danger of a person being burned by a sudden flow of hot water when initially rotating the stem 29.

Preferably the bodies 14 of the hot and cold water valves are made of tapering form and reversely tapered so that as the cold water valve is opened the volume of water pasing through the port controlled thereby will be gradually reduced, whereas when the hot water valve is being opened the flow of hot water controlled thereby will be gradually increased.

Suitable packing 35 is introduced into the tubular boss 28 on the cover or closure plate 22, about the stem 29, and held in position by a plug 36 screwed into said boss. The stem is provided with a shoulder 29ª which engages with the closure plate 22 to prevent outward longitudinal movement of the stem 29 and the stem is held between said plate and the inner wall of the mixing chamber so that it is only permitted to rotate.

Surrounding the boss 28 is an indicator plate 37 bearing on its outer face suitable marks to indicate in connection with the handle 40 secured to the outer end of the stem 29 the relative positions of the valves within the casing as is usual in apparatus of this character.

The plate 37 is held in place by a nut 38 engaging the exterior thread on the boss 28 and said plate extends completely over and entirely conceals the plate 22 and the means by which it is connected to the casing. Said plate 37 is provided with a curved marginal edge that meets the edge of the casing 1 and provides a neat and ornamental finish for the apparatus.

It is believed that the operation and advantages of the means described and illustrated will be readily apparent from the foregoing description and the drawings. It will be seen that the parts are relatively few in number and very compactly arranged. If it becomes necessary to obtain access to the interior of the casing the fastening means for the closure 22 are readily accessible by withdrawing the handle 40 from the stem 29 and detaching the nut 38. The plate 37 can then be easily removed and access had to the fastening screws 24.

By withdrawing the closure plate 22 access is readily had to the valves.

It will be seen that each valve is positively guided at both ends and that the springs 23 act to seat said valves independently so that after the hot water valve has become somewhat worn, due to use and the action of the hot water on the flexible member 16, said valve will still be maintained in proper contact with its seat without unduly straining the lifting yoke, as would otherwise be necessary if both valves were rigidly connected to said yoke.

Having thus described the invention what is claimed and desired to be secured by Letters Patent is:

1. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, a detachable closure for the mixing chamber, a rotatable stem extending through said closure and having its inner end seated in a bearing within the casing, said stem being provided within the casing with a threaded section, a yoke engaging the threaded section of said stem and having arms extending across the ports connecting the mixing chamber with the hot and cold water chambers, a valve controlling each of said ports and having a stem extending freely through the adjacent arm of the yoke, an abutment on each valve stem in the path of the yoke arm as it moves away from the valve head, a spring surrounding each valve stem between said abutment thereon and the mixing chamber closure, and means connected to the rotatable stem outside the casing for rotating the stem to move the yoke away from or toward the ports between the mixing chamber and the hot and cold water chambers.

2. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, a plurality of lugs extending inward from the side wall of the mixing chamber, a closure plate for the mixing chamber detachably connected to said lugs and provided with an outwardly extending tubular boss, a rotatable stem extending through said boss and having its inner end seated in a bearing within the casing, said stem having a threaded section within the casing, spring pressed valves normally closing the ports between the mixing chamber and the hot and cold water chambers, a yoke engaging the threaded section of the rotatable stem and adapted to move said valves in one direction, and means on said stem outside of the casing for rotating it.

3. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, spring pressed valves controlling the ports between the mixing chamber and the hot and cold water chambers, each having a tapered head extending through its port and having an enlargement or collar on its stem at some distance from the head, the heads of the two valves being reversely tapered, a rotatable stem mounted in the casing and extending to the outside thereof, said stem being held from longitudinal movement and having a threaded section within the casing, a yoke engaging the threaded section of the rotatable stem and having arms loosely embracing the stems of said valves between the heads thereof and the enlargements or collars thereon, and means on said stem outside the casing for rotating it.

4. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, a closure for the casing provided with an outwardly projecting tubular boss, a rotatable stem extending through said boss into the casing and provided therein with a threaded section, the stem being held against longitudinal movement, a valve controlling each port between the mixing and hot and cold water chambers, and comprising a tapered head, a stem extending beyond both ends of the head, and an abutment on the stem within the mixing chamber spaced from the head, said valve heads being reversely tapered, a spring surrounding each valve stem and exerting pressure on the abutment thereon to move the valve toward its port, guides on the casing for both ends of each valve stem, a yoke engaging the threaded section of the rotatable stem and having arms loosely embracing the valve stems between the heads and abutments thereon, and means on said rotatable stem outside the casing for rotating it.

5. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, a closure for the mixing chamber provided with an outwardly projecting tubular boss, and having on its inner face tubular projections in alignment with the ports between the mixing and hot and cold water chambers, a rotatable stem extending through said boss into the casing and provided therein with a threaded section, the stem being held against longitudinal movement, a valve controlling each port between the mixing and hot and cold water chambers and comprising a tapered head, a stem extending from the head and into the aligned projection on the inner surface of the aforesaid closure for the mixing chamber, and an abutment on said stem and spaced from the head, said valve heads being reversely tapered, a spring surrounding each inward projection of the closure for the mixing chamber and the adjacent portion of the valve stem and bearing against said closure and the abutment on the valve stem, a yoke engaging the threaded section of the rotatable stem and having arms loosely embracing the valve stems between the valve heads and abutments on said stems, and means on said rotatable stem outside the casing for rotating it.

6. In an apparatus of the character described, the combination of a casing provided with hot and cold water inlets and an outlet and having its interior divided into two chambers connected to said inlets, respectively, and a mixing chamber connected with the outlet and having two ports communicating, respectively, with the hot and cold water chambers, a closure for the mixing chamber provided with an outwardly extending, externally threaded, tubular boss, a rotatable stem extending through said boss into the casing and provided therein with a threaded section, the stem being held against longitudinal movement, spring pressed valves controlling the ports between the mixing chamber and the hot and cold water chambers, a yoke engaging the threaded section of the rotatable stem and having arms adapted to move the valves in opposition to their springs, means connected to said stem outside the casing for rotating it, an indicator plate surrounding the tubular boss on the mixing chamber closure, and a nut engaging said boss and holding the indicator plate in position.

In testimony whereof we have hereunto set our hands.

PHILIP MUELLER.
ANTON C. SCHUERMANN.